United States Patent [19]
Noda et al.

[11] Patent Number: 6,046,939
[45] Date of Patent: Apr. 4, 2000

[54] NONVOLATILE SEMICONDUCTOR MEMORY WITH FAST DATA PROGRAMMING AND ERASING FUNCTION USING ECC

[75] Inventors: Masanori Noda; Kenshiro Arase; Toshinobu Sugiyama; Ihachi Naiki, all of Kanagawa, Japan

[73] Assignee: Sony Corporation, Tokyo, Japan

[21] Appl. No.: 09/234,848

[22] Filed: Jan. 22, 1999

Related U.S. Application Data

[62] Division of application No. 08/975,712, Nov. 21, 1997, Pat. No. 5,920,502.

[30] Foreign Application Priority Data

Mar. 11, 1996 [JP] Japan ................................. 9-055769
Dec. 3, 1996 [JP] Japan ................................. 8-323011
Dec. 4, 1996 [JP] Japan ................................. 8-324293

[51] Int. Cl.[7] ................................................ G11C 7/00
[52] U.S. Cl. .......................... 365/185.09; 365/185.22; 365/189.05; 365/200; 365/233; 365/236; 365/238.05
[58] Field of Search ........................... 365/185.09, 200, 365/189.05, 185.22, 185.17, 233, 236, 238.5, 185.12

[56] References Cited

U.S. PATENT DOCUMENTS 5,606,532 2/1997 Lambrache et al. ................. 365/200 X
5,771,346 6/1998 Norman et al. ................. 365/185.22 X

*Primary Examiner*—Do Hyun Yoo
*Attorney, Agent, or Firm*—Ronald P. Kananen; Rader, Fishman & Grauer

[57] ABSTRACT

A semiconductor nonvolatile memory wherein memory cells in which data is electrically processed are arranged in the form of a matrix, provided with an error correcting circuit for correcting error bits when there are less than a predetermined number of error bits in a plurality of bits of data; a circuit for processing data in units of the plurality of bits of data in the memory cells of the plurality of units and for counting the number of the unprocessed memory cells after data is processed; and a circuit for ending the processing of the data while leaving the unprocessed memory cells when the number of the unprocessed memory cells is less than the predetermined number of error bits and making the error correcting means save the error bits.

7 Claims, 12 Drawing Sheets

FIG. 1A
PRIOR ART
FIG. 1B
PRIOR ART
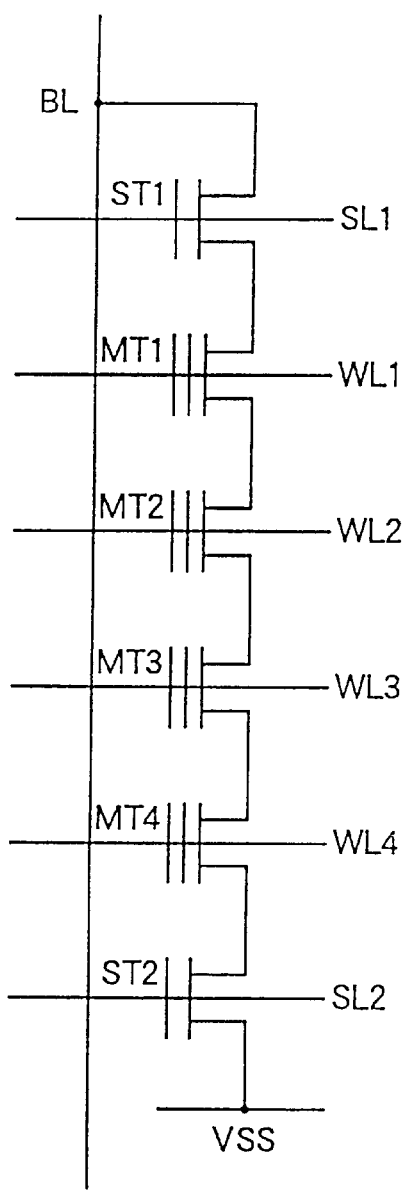
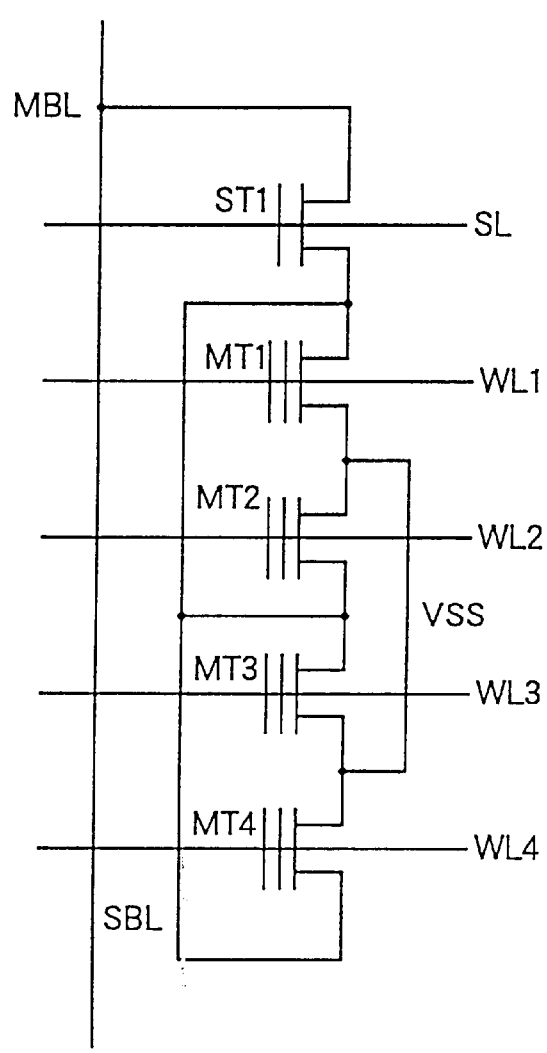

FIG. 8

| NORMAL DATA BIT NUMBER n | 8 | 16 | 32 | 64 | 128 | 256 | 512 | 1024 |
|---|---|---|---|---|---|---|---|---|
| ERROR INSPECTION BIT NUMBER j | 4 | 5 | 6 | 7 | 8 | 9 | 10 | 11 |

…

NONVOLATILE SEMICONDUCTOR MEMORY WITH FAST DATA PROGRAMMING AND ERASING FUNCTION USING ECC

This application is a divisional of application Ser. No. 08/975,712 filed Nov. 21, 1997 now U.S. Pat. No. 5,920,502.

BACKGROUND OF THE INVENTION

1. Field of the Invention

The present invention relates to a semiconductor nonvolatile memory capable of electrically programming data, more particularly relates to an increase of speed of data programming and erasing.

2. Description of the Related Art

In a semiconductor nonvolatile memory such as a NAND type flash memory and DINOR type flash memory, data is programmed together for all memory cells connected to a selected word line.

Namely, page programming is carried out in units of word lines.

FIG. 1A and FIG. 1B are views of memory array structures in NAND type and DINOR type flash memories, respectively.

FIG. 1A is a view, for convenience, of a NAND type flash memory array where four memory cells are connected to one NAND string connected to one bit line.

In FIG. 1A, BL denote a bit line. A NAND string comprised of two selection transistors ST1 to ST2 and four memory cells MT1 to MT4 connected in series is connected to the bit line BL.

The selection transistors ST1 and ST2 are respectively controlled by selection gate lines SL1 and SL2. Memory cells MT1 to MT4 are respectively controlled by word lines WL1 to WL4.

FIG. 1B is a view, for convenience, of a DINOR type flash memory array where four memory transistors are connected to one sub-bit line connected to one main bit line.

In FIG. 1B, MBL denotes a main bit line and SBL denotes a sub-bit line. The main bit line MBL and the sub-bit line SBL are operationally connected via the selection transistor ST1 controlled by the selection gate line SL.

The sub-bit line SBL intersects four word lines WL1 to WL4. Four memory cells MT1 to MT4 are arranged at their intersections.

Further, in a semiconductor nonvolatile memory such as a NOR type flash memory, data is rewritten by erasing data in predetermined block units (for example, about 64 Kbytes), then programming data in the memory cells of the erased block.

FIG. 2 is a view of a memory array structure and biasing conditions at the time of erasing data in a general NOR type flash memory.

In the NOR type flash memory of FIG. 2, for convenience, memory cells MT11 to MT44 are arranged in the form of a matrix at the lattice positions of the four word lines WL1 to WL4 and the four bit lines BL1 to BL4.

Next, an explanation will be made of a data erasing operation in the NOR type flash memory of FIG. 2.

In the erasing of data, as shown in FIG. 2, all word lines WL1 to WL4 in the memory array of the block to be erased are placed at the ground level (0 V), all bit lines BL1 to BL4 are placed in a floating state, and an erasing voltage pulse of a high voltage (for example, 12 V) is applied to a common source line VSS.

As a result, the electrons stored in the memory cells are drained from the source side by a tunnel current at the time of programming data so the threshold voltage Vth of each memory cell changes from the 6 V to 7 V of the data programming state to 2 V to 3 V of the erasing state.

As stated above, in a semiconductor nonvolatile memory performing page programming in units of word line sectors such as a NAND type and DINOR type flash memory, the data is programmed together for all memory cells connected to the selected word line. However, in the memory cells connected to the selected word line, a difference occurs in the programming speed due to variations of size etc. derived from the manufacturing process.

FIG. 3 is a view of the difference of the programming speed between memory cells connected to the selected word line. In FIG. 3, an abscissa represents the required programming time for each memory cell (tPROG).

Further, the ordinate represents the number of memory cells (N), that is, the frequency of distribution of the number of memory cells corresponding to the abscissa tPROG (programming time).

As shown in FIG. 3, in a semiconductor nonvolatile memory performing page programming in units of word line sectors such as a NAND type flash memory, there is a difference in the required programming time tPROG between memory cells.

Taking such variations of the program speed into account, in a general NAND type flash memory etc., from the viewpoint of keeping the differences of the threshold voltage Vth at the time of programming small, the programming operation is carried out via a verify operation. A so-called "bit-by-bit" program/verify operation is carried out successively prohibiting programming from the programmed memory cells and repeatedly successively performing the program/verify operation until all of the memory cells finished being programmed.

However, as shown in FIG. 3, in the case of a general memory cell, the required programming time tPROG is the t0 in the figure, but there are very rare cases where there is a memory cell requiring a very long programming time tPROG, for example, t1 in the figure due to variations of the manufacturing processes etc.

In such a case, due to this very rare memory cell slow in programming, the number of the program/verify operations becomes very large, for example, 100 times or more. As a result, the time required for finishing the page programming also becomes very long.

FIG. 4 is a view of the sequence flow at the time of data programming in a semiconductor nonvolatile memory performing page programming in units of word line sectors such as the NAND type flash memory of the related art.

Below, an explanation will be made of the sequence flow of FIG. 4.

At step SF1, the data programming is commenced. First, at step SF2, the page program data is transferred to a data latch circuit provided for every bit line in the memory array.

Next, at step SF3, the number of times K of the program/verify operations is reset to 0, then a programming operation applying a program pulse (step SF4) and a veritfy/reading operation automatically setting the re-program data after the verify/reading (step SF5) are continuously carried out.

Next, at step SF6, end point detection to determine if all of the memory cells have finished being programmed is carried out by checking whether or not there are one or more unprogrammed memory cell remaining in the re-program data.

As a result, when the end point showing that all of the bits have finished being programmed is detected, the data programming is ended (step SF9).

On the other hand, when the end point showing that all of the bits have finished being programmed cannot be detected, the number of times K of the program/verify operation is incremented (step SF7) and it is checked if K is less than a predetermined number of times k0 (for example about 100 times) set in advance (step SF8).

When K is less than k0, the sequence flow of step SF4 to step SF8 is carried out again. When K reaches k0, it is decided that the data programming has failed (step SF10).

This predetermined number of times K0 of the program/verify operation becomes very large, for example 100 times or more, in the case of the NAND type flash memory of the related art due to the very rare memory cells with slow programming speeds. As a result, the time required for finishing the page programming becomes very long.

Further, in a semiconductor nonvolatile memory such as a NOR type flash memory, data is rewritten by erasing data in predetermined block units (for example about 64 Kbytes), then data is programmed in block units. However, there are differences in the erasing speed in the memory cells in the erased block unit due to variations of size etc. stemming from the manufacturing process.

FIG. 5 is a view of the difference of erasing speeds between memory cells in an erased block. In FIG. 5, the abscissa represents the erasing time (terase), that is, the required erasing time of each memory cell. Further, the ordinate represents the number of memory cells (N), that is, the frequency of distribution of the number of memory cells corresponding to the abscissa terase (erasing time).

As shown in FIG. 5, in a semiconductor nonvolatile memory erasing data in predetermined block units such as a NOR type flash memory, there is a difference in the required erasing time terase between memory cells.

Taking such variations of the erasing speed into account, in a general NOR type flash memory, the erasing operation is carried out via a verify operation. The erasing/verify operation is repeatedly carried out until the data of all memory cells in the erased block finishes being erased.

However, as shown in FIG. 5, in the case of a general memory cell, the required erasing time terase is the t0 in the figure, but there are very rare cases where there is a memory cell requiring a very long erasing time terase, i.e., requiring for example t1 or more in the figure, due to variations in the manufacturing process etc.

In such a case, due to this very rare memory cell slow in programming, the number of the erasing/verify operations becomes very large, for example 100 times to 1000 times or more. As a result, the time required for finishing the erasing operation becomes very long. Consequently, the time required for the rewriting of the data also becomes long.

Further, when the frequency of erasing/verify operations becomes very large due to the very rare memory cell with the slow erasing speed, the memory cells with the fast erasing speed are excessively erased and the threshold voltage Vth of the memory cells becomes depleted in state (Vth<0). This becomes a cause of malfunctions.

FIG. 6 is a view of the sequence flow at the time of erasing data and programming data after this in a semiconductor nonvolatile memory rewriting data in predetermined block units such as a NOR type flash memory of the related art.

Below, an explanation will be made of the sequence flow of FIG. 6.

At step SF21, the data erasure is commenced. At step SF22, the number of times L of the erasing/verify operation is set to an initial "1", then an erasing operation applying an erasing pulse (step SF23) and a verify/reading operation (step SF24) are continuously carried out.

When as a result of the verify/reading operation of step SF24, the end point showing that all of the memory cells in the block have finished being erased is detected (step SF25), the data erasing is ended and the data programming operation of step SF101 is commenced.

On the other hand, when as a result of the verify/reading operation of step SF24, the end point showing that all of the memory cells in the block have finished being erased is not detected (step SF25), at step SF26, it is checked whether or not the number of times K of the erasing/verify operation is less than the predetermined number of times K0 (for example about 100 to 1000 times) set in advance.

When the number of times K of the erasing/verify operation is less than the set number of times k0, the number of times K of the erasing/verify operation is further incremented (step SF27) and the sequence flow of steps SF23 to SF27 is carried out again. When the number of times K of the erasing/verify operation reaches the set number of times K0, it is decided that the data erasure has failed (step SF28).

Next, when the end point showing that all of the memory cells have finished being erased can-be detected, the data programming is commenced.

First, at step SF101, the address Ar-NO of the memory cell is set to the initial "1" then the data is programmed in the memory cell in accordance with the content of the data (step SF102) and it is checked whether or not the address Ar-NO is the last address (step SF103).

When the address Ar-NO is not the last address, the address Ar-NO is further incremented (step SF104) and the sequence flow of steps SF102 to SF104 is carried out again. Then, when the address Ar-NO reaches the last address, the data programming is ended (step SF105) In the above sequence flow, the predetermined number of times K0 of the erasing/verlfy operation becomes very large, for example, about 100 times to 1000 times in the case of the NOR type flash memory of the related art due to the very rare memory cell with a slow erasing speed. As a result, the time required for finishing the erasing operation becomes very long. Consequently, the time required for rewriting the data becomes long. Further, memory cells with a very high erasing speed are excessively erased due to the memory cell with the slow erasing speed. This become a cause of malfunctions.

SUMMARY OF THE INVENTION

The present invention was made in consideration with such a circumstance and has as an object thereof to provide a semiconductor nonvolatile memory capable of programming data and erasing data at a high speed, able to rewrite data at a high speed, and further capable of preventing excessively erased memory cells and achieving improved reliability.

To achieve the above object, the present invention provides a semiconductor nonvolatile memory wherein memory cells in which data is electrically processed are arranged in the form of a matrix, provided with an error correcting means for correcting error bits when there are less than a predetermined number of error bits in a plurality of bits of data; a means for processing data in units of the plurality of bits of data in the memory cells of the plurality of units and for counting the number of the unprocessed memory cells after data is processed; and a means for ending the processing of the data while leaving the unprocessed memory cells when the number of the unprocessed memory cells is less than the predetermined number of error bits and making the error correcting means save the error bits.

According to a first aspect of the present invention, there is provided a semiconductor nonvolatile memory comprised of memory cells which are electrically programmed with data arranged in the form of a matrix, provided with an error correcting means for reading data in units of a plurality of bits of data and correcting error bits when there are less than a predetermined number of error bits in the plurality of bits of data; a means for programming data in units of the plurality of bits of data in the memory cells of the plurality of units and counting the number of the unprogrammed memory cells after the data programming; and a means for ending the data programming while leaving the unprogrammed memory cells when the number of the unprogrammed memory cells is less than the predetermined number of error bits and making the error correcting means save the error bits.

For example, in a first embodiment of the present invention, there is provided a semiconductor nonvolatile memory wherein sector units of page program data are transferred to a data latch circuit provided for every bit line, data is programmed electrically together for all memory cells of the selected sector according to the data, and memory cells are arranged in the form of the matrix, provided with an error correcting means for reading the page data in units of the memory cells of the selected sector and correcting the error bits when there are less than a predetermined number of error bits in the page read data; a means for detecting whether or not there are unprogrammed memory cells in every programming operation, in which the data is programmed according to the page program data by repeatedly performing a plurality of programming operations via a verify/readIng operation; a means for counting the number of the unprogrammed memory cells when there are unprogrammed memory cells after the predetermined number of programming operations are repeatedly carried out; and a means for ending the data programming while leaving unprogrammed memory cells when the number of the unprogrammed memory cells is less than the predetermined number of error bits and making the error correcting means save the error bits.

Further, preferably, the error correcting means is provided with a means for generating an error inspection code from normal data to be programmed; a memory array constituted by a normal memory array portion for recording the normal data and a parity memory array portion for recording the error inspection code; a means for programming the page program data combined with the normal data by the error inspection code in the memory array; and a means for correcting the error bits at the time of programming data by the read normal data and the error inspection code at the time of reading the page program data.

Further, preferably, the means for detecting the unprogrammed memory cells is provided with a means for automatically setting the re-program data by successively inverting data latched in data latch circuits connected to the programmed memory cells at every verify/reading operation after each programming operation and an end point detecting means for detecting whether there is one or more data latch circuits latching unprogrammed data after the automatic setting of the re-program data.

According to the semiconductor nonvolatile memory of the first embodiment of the present invention, even if there are unprogrammed memory cells after the predetermined number of times of data processing, for example, programming operations, is carried out, if the number of the unprogrammed memory cells is less than the predetermined number of error bits which can be corrected by the error correcting means, the data programming is ended while leaving the unprogrammed memory cells as they are.

Accordingly, high speed data programming becomes possible without restricting the speed to that of the very rare memory cells with a slow programming speed.

According to a second aspect of the present invention, there is provided a semiconductor nonvolatile memory comprised of memory cells whose data can be rewritten by electrically erasing and programming data arranged in the form of a matrix, provided with an error correcting means for reading data in units of a plurality of bits of data and correcting the error bits when there are less than a predetermined number of error bits in the units of a plurality of bits of data; a means for erasing data from the memory cells of at least one of the units of a plurality of bits of data and counting the number of the unerased memory cells in the units of the plurality of bits of data after erasing the data; and a means for programming data while leaving the unerased memory cells when the number of the unerased memory cells is less than the predetermined number of error bits and making the error correcting means save the error bits at the time of reading data.

For example, in a second embodiment of the present Iinvention, there is provided a semiconductor nonvolatile memory comprised of memory cells whose data can be rewritten by electrically erasing and programming data arranged in the form of a matrix, provided with an error correcting means for reading data in units of a plurality of bits of data and correcting the error bits when there are less than a predetermined number of error bits in the units of the plurality of bits of data; a means for erasing data from the memory cells of at least one of the units of the plurality of bits of data by repeatedly applying a plurality of erasing voltage pulses via a verify/reading operation and detecting whether or not there are unerased memory cells for every erasing operation; a means for counting the number of the unerased memory cells within the units of the plurality of bits of data when there are unerased memory cells after repeatedly performing the predetermined number of erasing operations; and a means for programming data while leaving unerased memory cells when the number of the unerased memory cells is less than a predetermined number of the error bits and making the error correcting means save the error bits at the time of reading the data.

Further, preferably, the error correcting means is provided with a means for generating an error inspection code from normal data to be programmed; a memory array constituted by a normal memory array portion for recording normal data and a parity memory array portion for recording the error inspection code; a means for programming the program data in units of the plurality of bits of data combined with the normal data by the error inspection code in the memory array after erasing the data; and a means for correcting the error bits at the time of programming data by the read normal data and the error inspection code at the time of reading the units of the plurality of bits of data.

Further, preferably, the counting means of the unerased memory cells reads pages by the operation of the column decoder synchronized to a constant clock pulse, successively shifts the page read data to the counting circuit, and counts the number of bits of the unerased data.

According to the semiconductor nonvolatile memory of the second embodiment of the present invention, even if there are unerased memory cells after repeatedly performing the predetermined number of erasing operations, when the number of the unerased memory cells is less than the predetermined number of error bits which can be corrected by the error correcting means, the data is programmed while leaving the unerased memory cells.

Accordingly, high speed data programming becomes possible without restriction by the very rare memory cell with the slow erasing speed. Consequently, data can be rewritten at a high speed.

Further, excessive erasing of memory cells with a fast erasing speed can be prevented, and a semiconductor nonvolatile memory having a high reliability can be realized.

BRIEF DESCRIPTION OF THE DRAWINGS

These and other objects and features of the present invention will become clearer from the following description of the preferred embodiments made with reference to the attached drawings, in which:

FIGS. 1A and 1B are views of memory array structures in NAND type and DINOR type flash memories, respectively;

FIG. 8 is a view of a relationship between a number p of bits of normal data enabling an error bit to be handled and a number j of bits of parity data (number of error inspection bits) in an error correcting means in the semiconductor nonvolatile memory of FIG. 7;

DESCRIPTION OF THE PREFERRED EMBODIMENTS

First Embodiment

Figure 2:
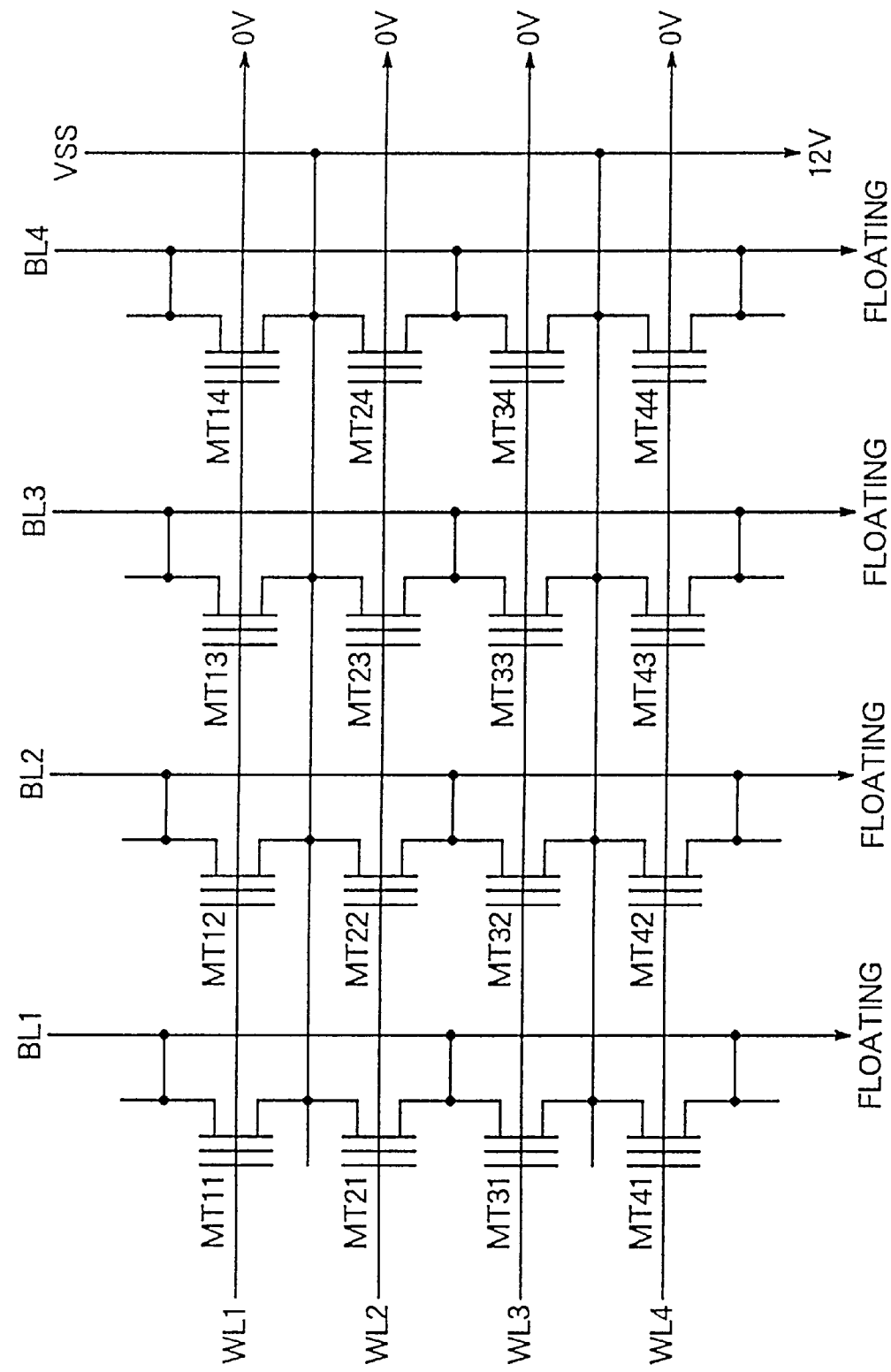
FIG. 2 is a view of a memory array structure and biasing conditions at the time of erasing data in a general NOR type flash memory.
Figure 3:
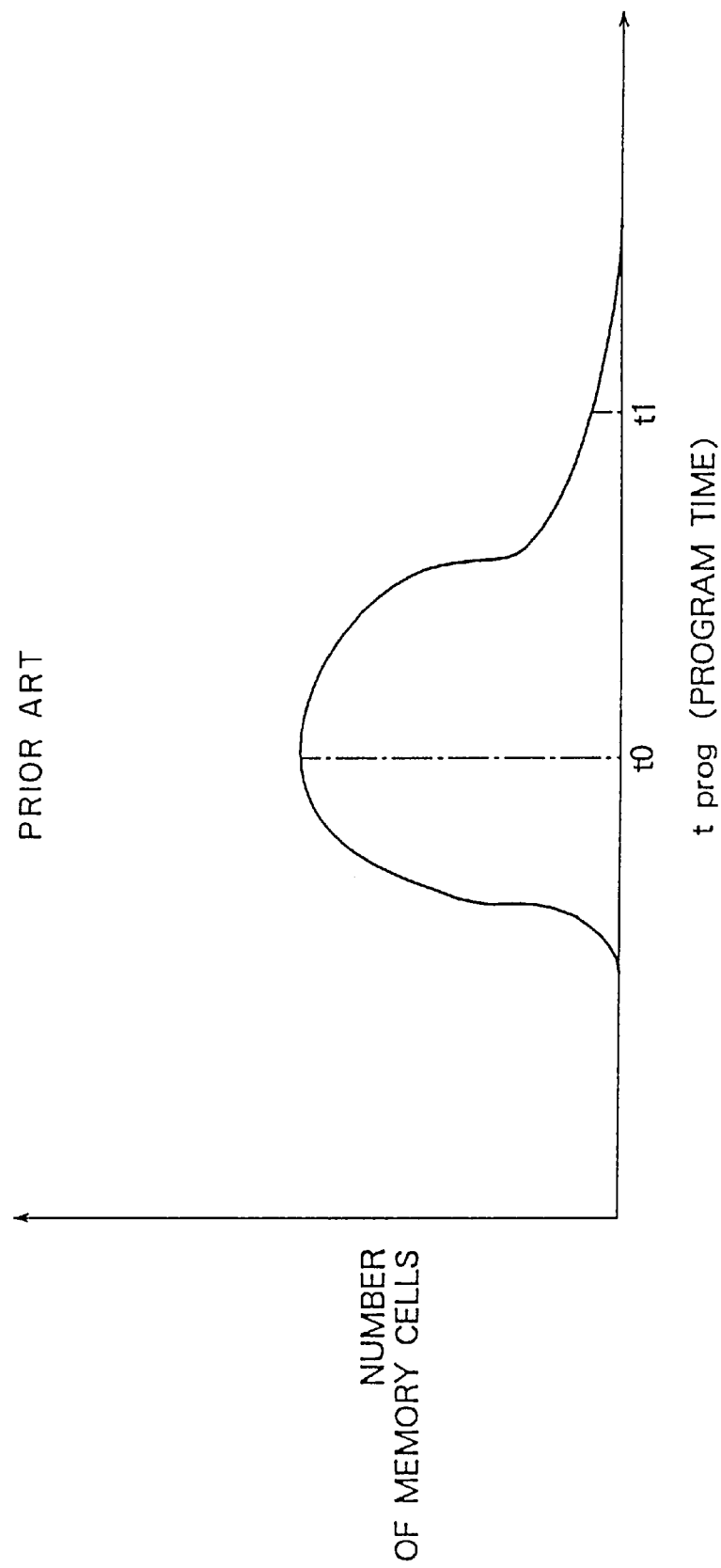
FIG. 3 is a view of the difference of programming speeds between memory cells in a semiconductor nonvolatile memory of the related art performing page programming in units of word line sectors.
Figure 4:
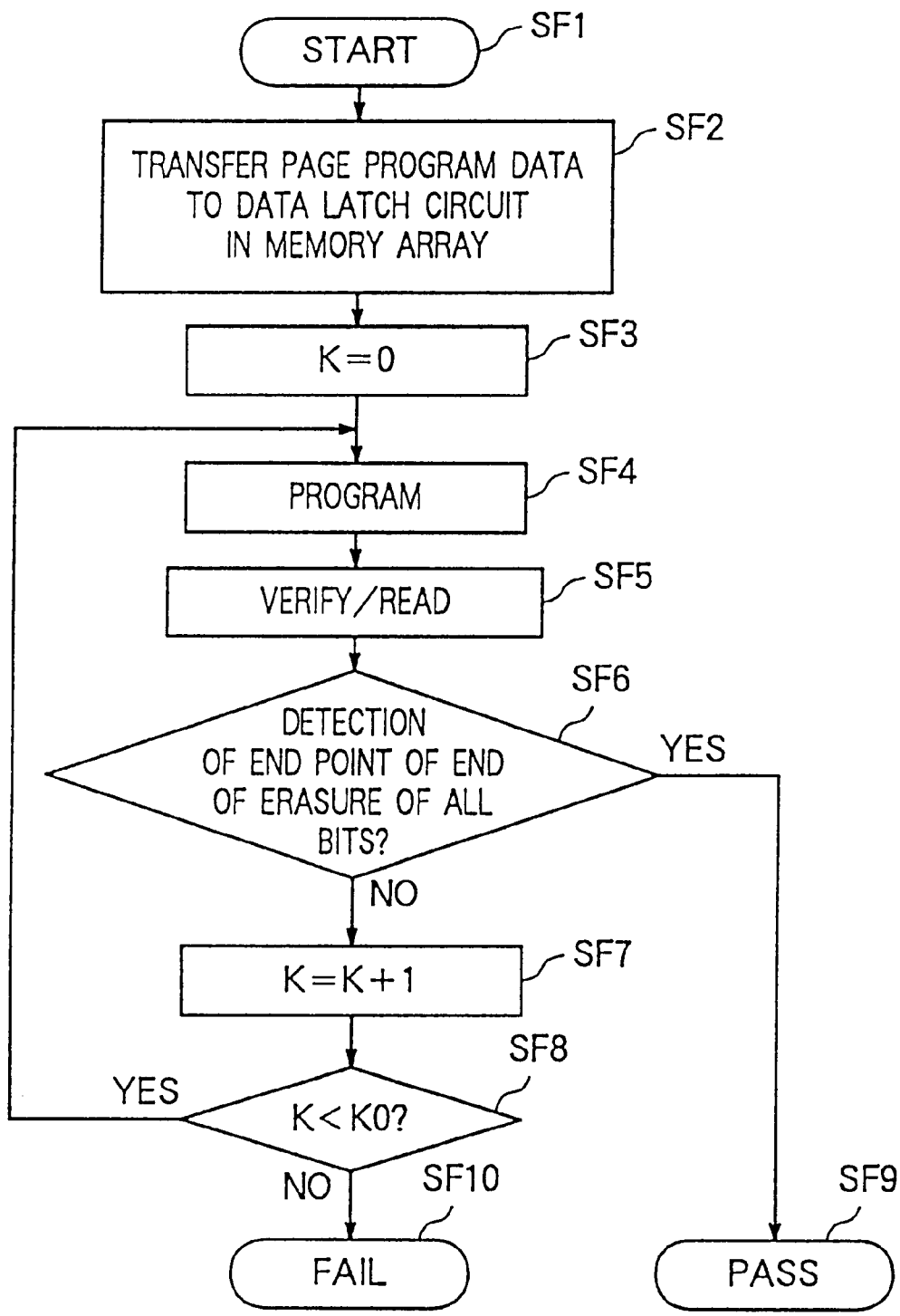
FIG. 4 is a view of a sequence flow at programming data in a semiconductor nonvolatile memory of the related art performing the page programming in units of word line sectors.
Figure 5:
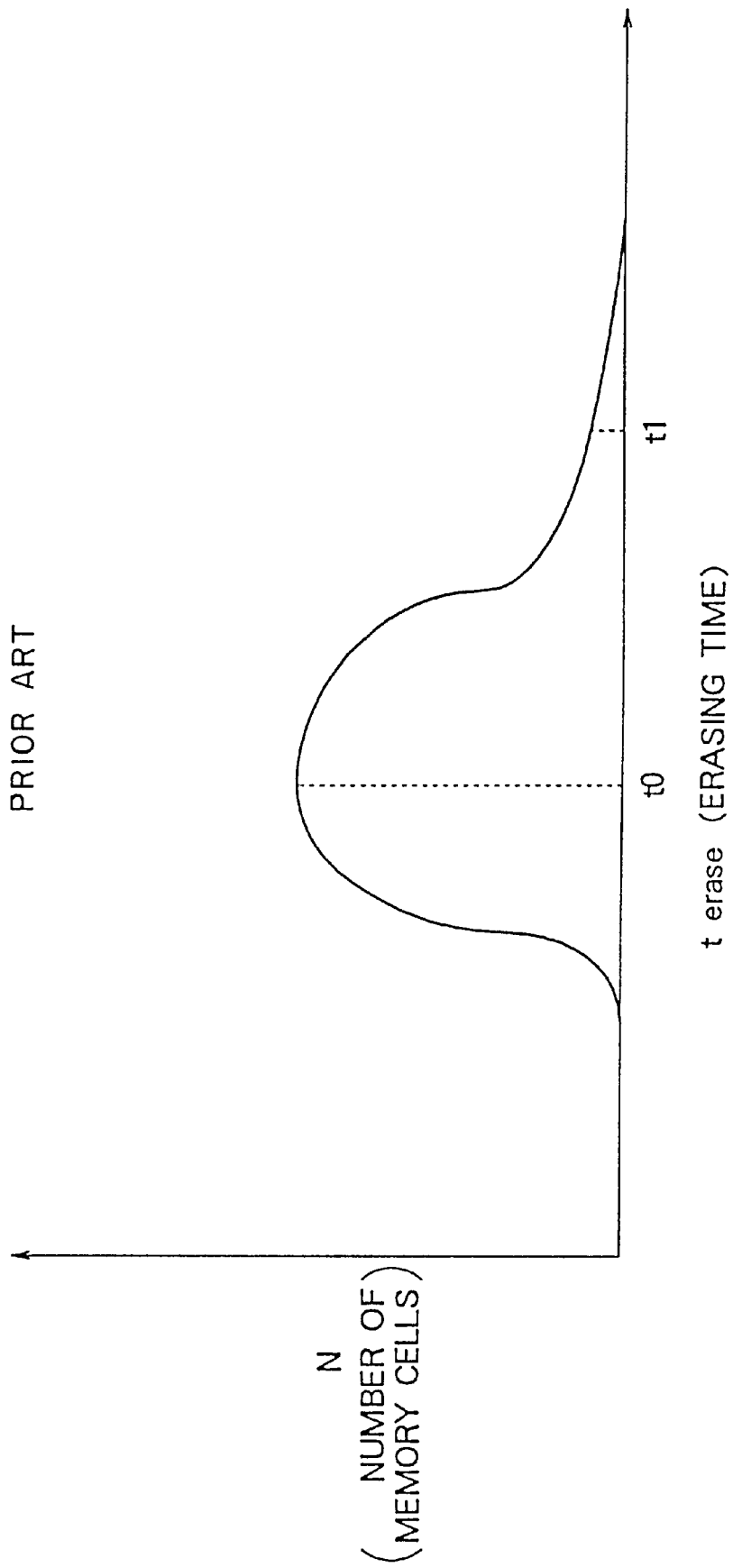
FIG. 5 is a view of the difference of the erasing speeds between memory cells in an erased block.
Figure 6:
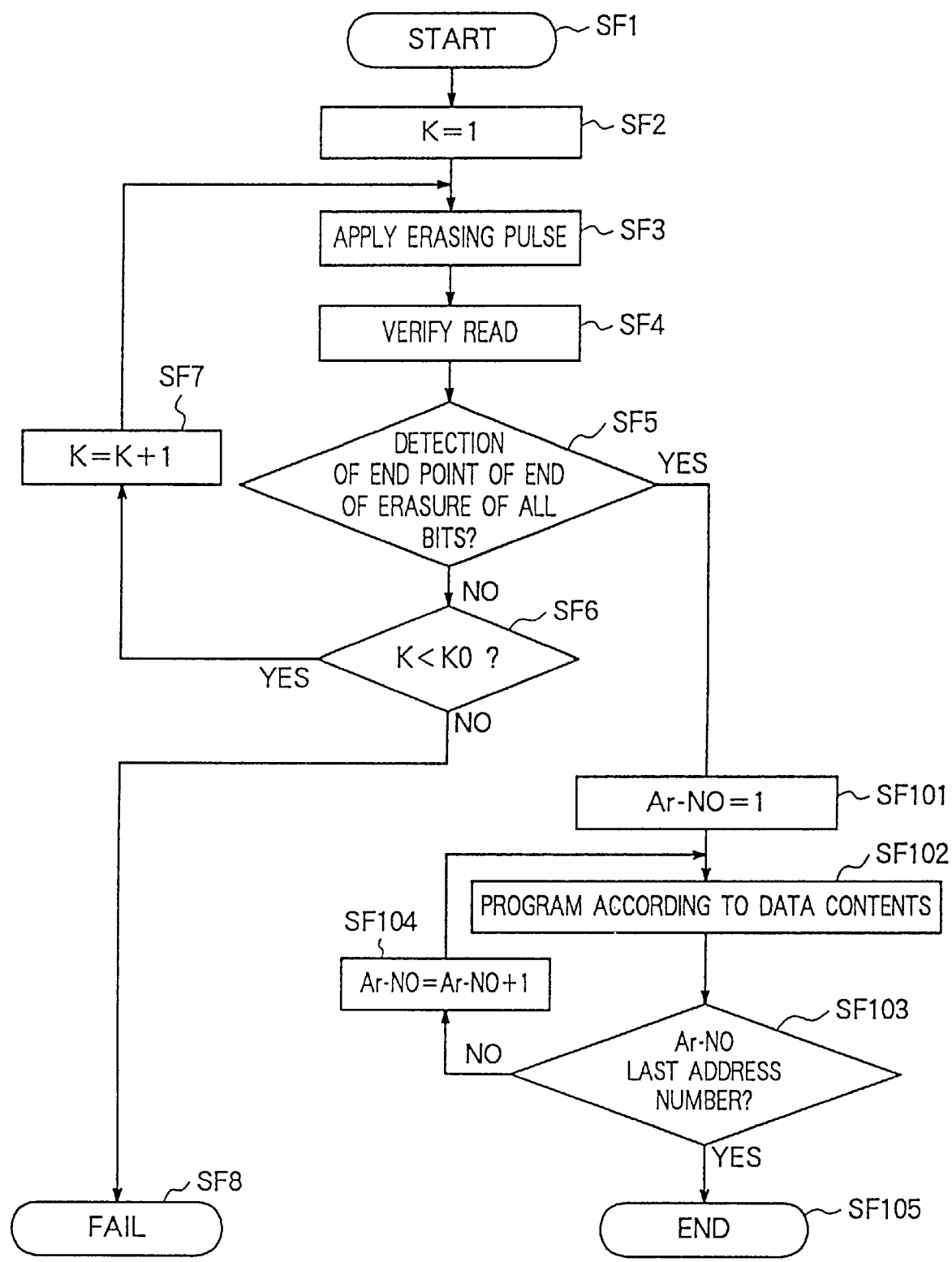
FIG. 6 is a view of the sequence flow at the time of rewriting data in the NOR type flash memory of the related art.
Figure 7:
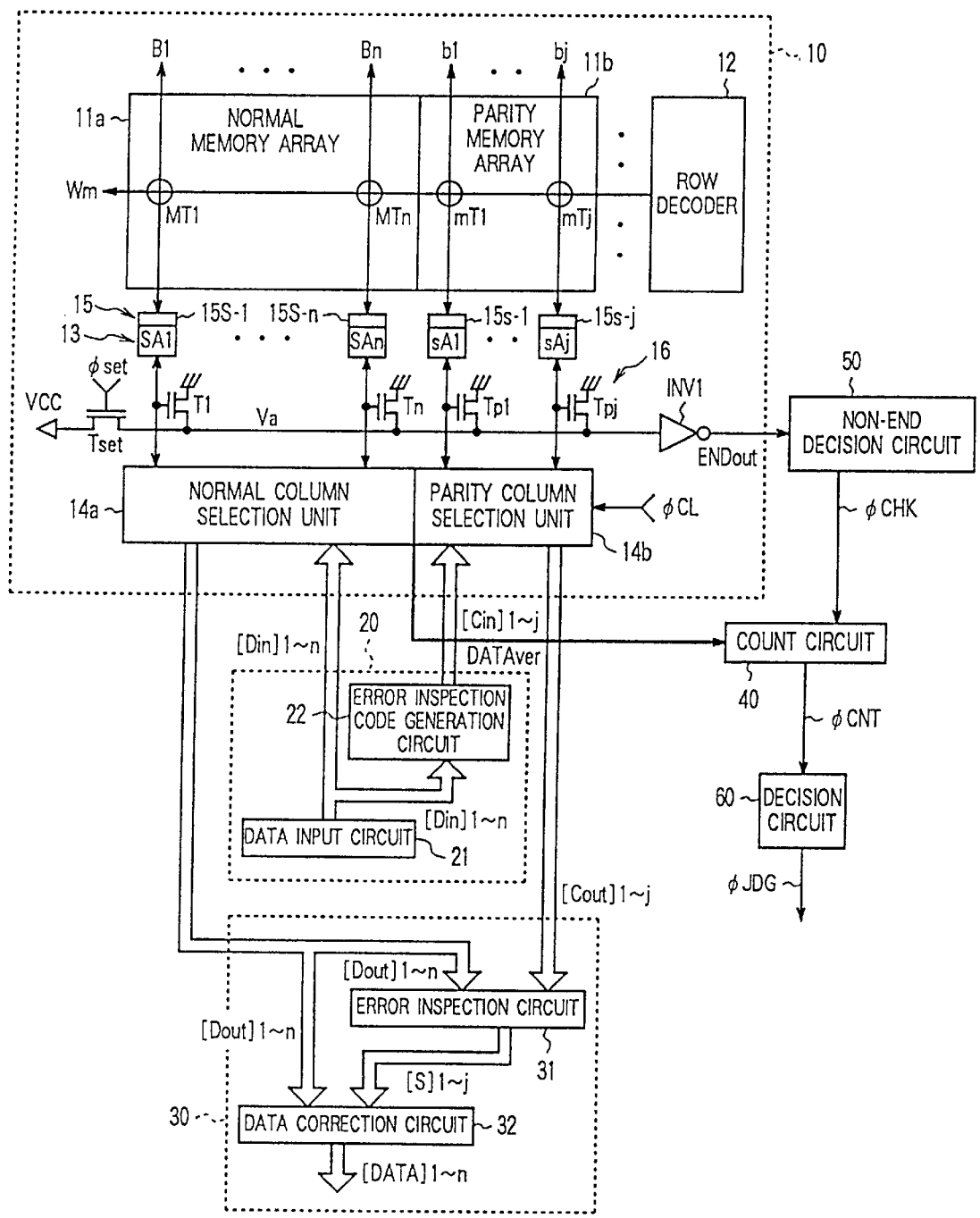
FIG. 7 is a view of an example of the configuration of a semiconductor nonvolatile memory according to first embodiment of the present invention.

FIG. 7 is a view of a concrete example of the configuration of a semiconductor nonvolatile memory according to the present invention, for example, a NAND type flash memory.

In FIG. 7, 10 denotes a memory. The memory 10 is constituted by a memory array 11, a row decoder 12, a data latch circuit group 13 provided for the bit lines, a column selection unit 14, a re-program data automatic setting circuit group 15, an end point detection circuit 16, etc.

The memory array 11 is constituted by a normal memory array 11a and a parity memory array 11b.

In the normal memory array 11a, n (usually about 512 bytes) number of normal bit lines B1 to Bn are arranged. In the parity memory array 11b, j (usually about 10 bytes) number of parity bit lines b1 to bj are arranged.

Note that, in the figure, a case where the word line Wm is selected and page programming is carried out with respect to the normal memory cells MT1 to MTn and parity memory cells mT1 to mTj is illustrated.

The data latch circuit group 13 is constituted by normal data latch circuits SA1 to SAn and parity data latch circuits sA1 to sAj. The column selection unit 14 is constituted by a normal column selection unit 14a and a parity column selection unit 14b.

The column selection unit 14 operates in synchronization with a data transfer clock signal $\Phi CL$, shifts the page program data to the normal data latch circuits SA1 to SAn and the parity data latch circuits sA1 to sAj, and reads the page data from the data latch circuit SA1 to SAn.

The re-program data automatic setting circuit group 15 is constituted by automatic setting circuits 15S1-1 to 15S-n and 15s-1 to 15s-j provided corresponding to the normal data latch circuits SA1 to SAn and the parity data latch circuits sA1 to sAj.

The automatic setting circuits 15S1-1 to 15S-n and 15s-1 to 15s-j successively invert the data latched in the data latch circuits connected to the memory cells finished being programmed for every verify/reading operation after each programming operation and automatically set the re-program data.

The end point detection circuit 16 is constituted by transistors T1 to tn and Tp1 to Tpj provided for the normal data latch circuits SA1 to SAn and parity data latch circuits sA1 to sAj, a transistor Tset, and an inversion circuit INV1.

The gate electrodes of the transistors T1 to tn and Tp1 to Tpj are connected to inverted outputs of the normal data latch circuits SA1 to SAn and the parity data latch circuits sA1 to sAj, the source electrodes are connected to the ground potential, and the drain electrodes are commonly connected. When there are unprogrammed cells and the inverted output of at least one data latch circuit is at a high level, the commonly connected end point detection potential Va becomes the ground potential and an end point detection signal ENDout is output as high level by the inversion circuit INV1.

Further, the transistor Tset is provided for precharging the end point detection potential Va to the VCC level in advance and is driven by the precharge signal $\Phi set$ preceding the detection of the end point.

Reference numeral 20 denotes a data input unit. The data input unit 20 is constituted by a data input circuit 21 and an error inspection code generation circuit 22.

The data input circuit 21 inputs normal input data [Din]1 to [Din]n to the error inspection code generation circuit 22 which generates error inspection codes (parity input data) [Cin]1 to [Cin]j. The page program data formed by the normal input data [Din]1 to [Din]n and error inspection codes [Cin]1 to [Cin]j is shifted to the normal data latch circuits SA1 to SAn and the parity data latch circuits sA1 to sA$j$ in synchronization with the data transfer clock signal ΦCL and page-programmed in the corresponding normal memory cells and parity memory cells.

Reference numeral 30 denotes a data output unit. The data output unit 30 is constituted by an error inspection circuit 31 and a data correction circuit 32.

The error inspection circuit 31 generates data demodulation codes [S]1 to [S]$j$ by the page-read normal output data [Dout]1 to [Dout]$n$ and error inspection codes (parity output data) [Cout]1 to [Cout]$j$.

The data correction circuit 32 corrects the error bits by the normal output data [Dout]1 to [Dout]$n$ and data demodulation codes [S]1 to [S]$j$ when there are less than a predetermined number of error bits (for example one bit) in the page read data and outputs correct normal output data [DATA]1 to [DATA]$n$ after correction.

Reference numeral 40 denotes a count circuit. The count circuit 40 counts the number of the unprogrammed memory cells as follows when there are unprogrammed memory cells and the end point cannot be detected after repeating a program/verify operation a predetermined number of times (for example about 10 times), that is, when the output of at least one data latch circuit is at the low level.

Namely, it shifts and inputs an output DATAver of the inversion circuit INV2 of the verify page-read data DATAver in synchronization with the basic data transfer clock signal ΦCL and finally counts the number of the unprogrammed memory cells in accordance with the input of the check signal ΦCHK.

When inputting the output signal ENDout of the inversion circuit INV1 of the memory 10 at a high level, the non-end decision circuit 50 deems that there is an unprogrammed memory cell and outputs the check signal ΦCHK to the count circuit 40 so as to start the counting of the number of unprogrammed memory cells.

The decision circuit 60 deems that there are one or more unprogrammed cells and outputs a signal ΦjDG to a not illustrated control system if the output check signal ΦCNT of the count circuit 40 is switched to a high level.

In the case of the present embodiment, the decision circuit 60 is constituted by for example a flip-flop.

FIG. 8 is a view of the relationship between the number n of bits of normal data enabling a bit error to be handled and the number j of bits of parity data (number of error inspection bits) in the error correcting means in the semiconductor nonvolatile memory of FIG. 7.

No detailed description will be made of the principle of the error correction, error inspection code generation circuit 22, error inspection circuit 31, and data correction circuit 32 since they are not directly related to the gist of the present invention.

However, according to FIG. 8, 10 error inspection bits are necessary for 512 bits of normal data. Accordingly, it is necessary to generate 10 bits of error inspection codes [Cin]1 to [Cin]$j$ for 512 bits of normal input data [Din]1 to [Din]$n$.

Figure 9:
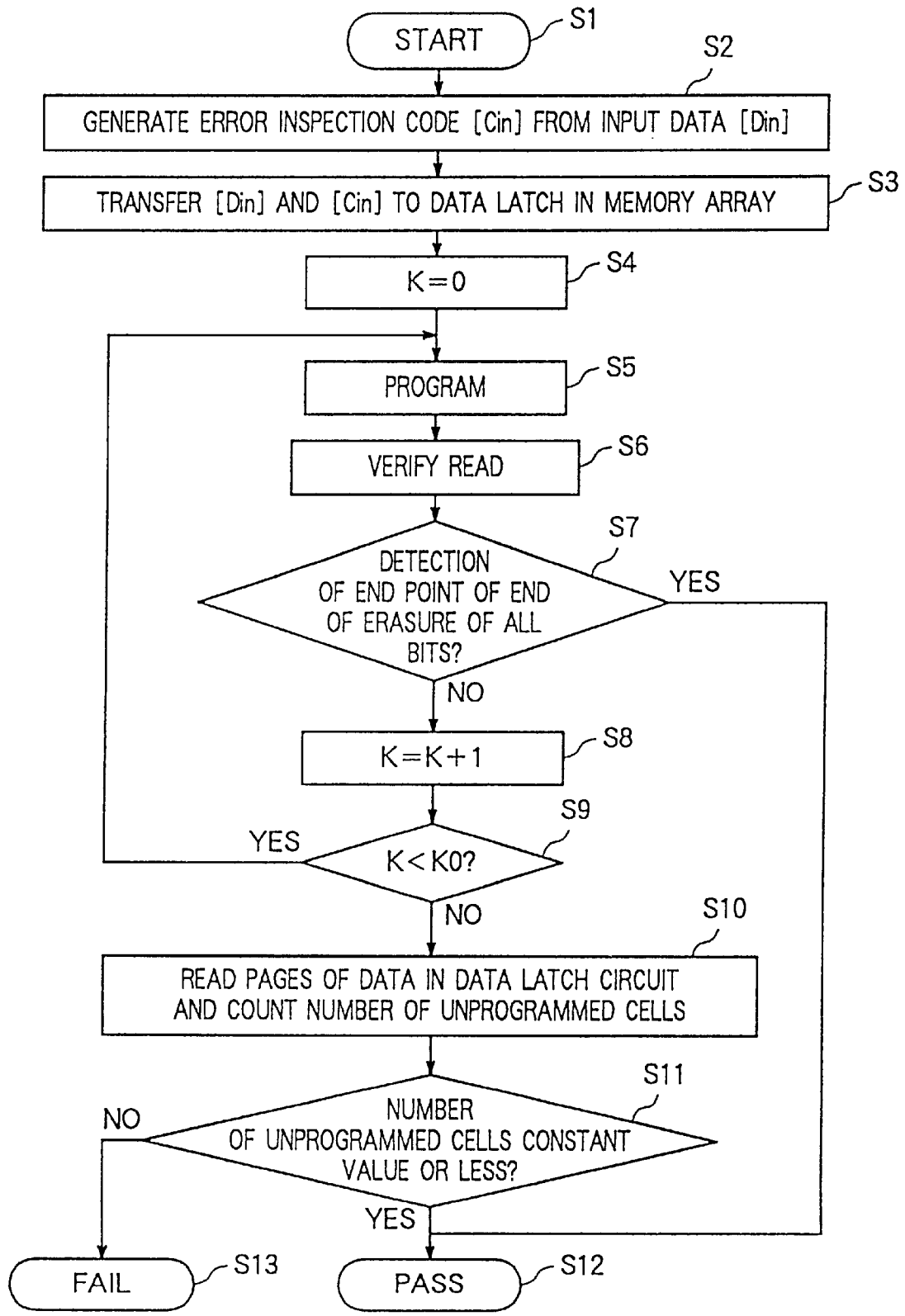
FIG. 9 is a view of the sequence flow at the time of programming data in the semiconductor nonvolatile memory of FIG. 7.

FIG. 9 is a view of the sequence flow at the time of data programming in the semiconductor nonvolatile memory of FIG. 7.

Below, an explanation will be made of the sequence flow of FIG. 9 while referring to the example of the configuration of FIG. 7 etc.

At step S1, the data programming is commenced. First, the error inspection codes [Cin]$j$ to [Cin]$j$ are generated by the error inspection code generation circuit 22 based on the normal input data [Din]1 to [Din]$n$ input via the data input circuit 21 (step S2).

Next, the normal input data [Din]1 to [Din]$n$ and the error inspection codes [Cin]1 to [Cin]$j$ are input to the normal column selection unit 14$a$ and the parity column selection unit 14$b$. The resultant page program data is transferred to the normal data latch circuits SA1 to SA$n$ and the parity data latch circuits sA1 to sA$j$ provided for the bit lines in the memory array (step S3).

Next, the number of times K of the program/verify operation is reset to 0 by a not illustrated program control system (step S4), the programming operation for applying the program pulse is carried out (step S5), and, after the verify/reading operation, the verify/reading operation successively inverting the data in the normal data latch circuits SA1 to SA$n$ and the parity data latch circuits sA1 to sA$j$ of the programmed memory cells and automatically setting the re-program data in the automatic setting circuits 15S-1 to 15S-$n$ and 15$s$-1 to 15$s$-$j$ (step S6) is continuously carried out.

Next, at step S7, the end point detection circuit 16 and the non-end decision circuit 50 detects the end point showing if all of the memory cells have finished being programmed by checking whether or not the data corresponding to at least one unprogrammed memory cell remains in the re-program data.

When it is possible to detect the end point showing that all of the bits have finished being programmed, the data programming is ended (step S12).

However, when it is not possible to detect the end point showing that all of the bits have finished being programmed, the number of times K of the program/verify operation is further incremented (step S8) and it is checked if K is less than the predetermined number of times k0 (for example about 10 times) set in advance (step S9)

Next, where K is less than k0, the sequence flow of steps S5 to S9 is carried out again. The routine proceeds to step S10 when K reaches k0.

Next, at step SlO, the data in the data latch circuit is page-read, and the number of the unprogrammed memory cells is counted at the count circuit 40.

Next, at step S11, it is checked if the number of the counted unprogrammed memory cells is less than a predetermined number for which error correction is possible (for example one).

When the number of the unprogrammed memory cells is less than the predetermined number for which error correction is possible, the data programming is ended (step S12). When it exceeds the predetermined number, it is decided that the data programming failed (step S13).

In the semiconductor nonvolatile memory of the present invention in which data was programmed by the above sequence flow, at the time of reading data, the error correction of the unprogrammed memory cells is carried out by the error inspection circuit 31 and the data correction circuit 32 and correct normal data [DATA]1 to [DATA]$n$ are read.

As explained above, by the semiconductor nonvolatile memory according to the first embodiment, even if there are unprogrammed memory cells after repeatedly performing the programming operation a predetermined number of times, when the number of the unprogrammed memory cells is less than the predetermined number of error bits which can be corrected by the error correcting means, the data programming is ended while leaving the unprogrammed memory cells.

Accordingly, high speed data programming becomes possible without being restricted by the very rare memory cell with a slow programming speed.

Second Embodiment

Figure 10:
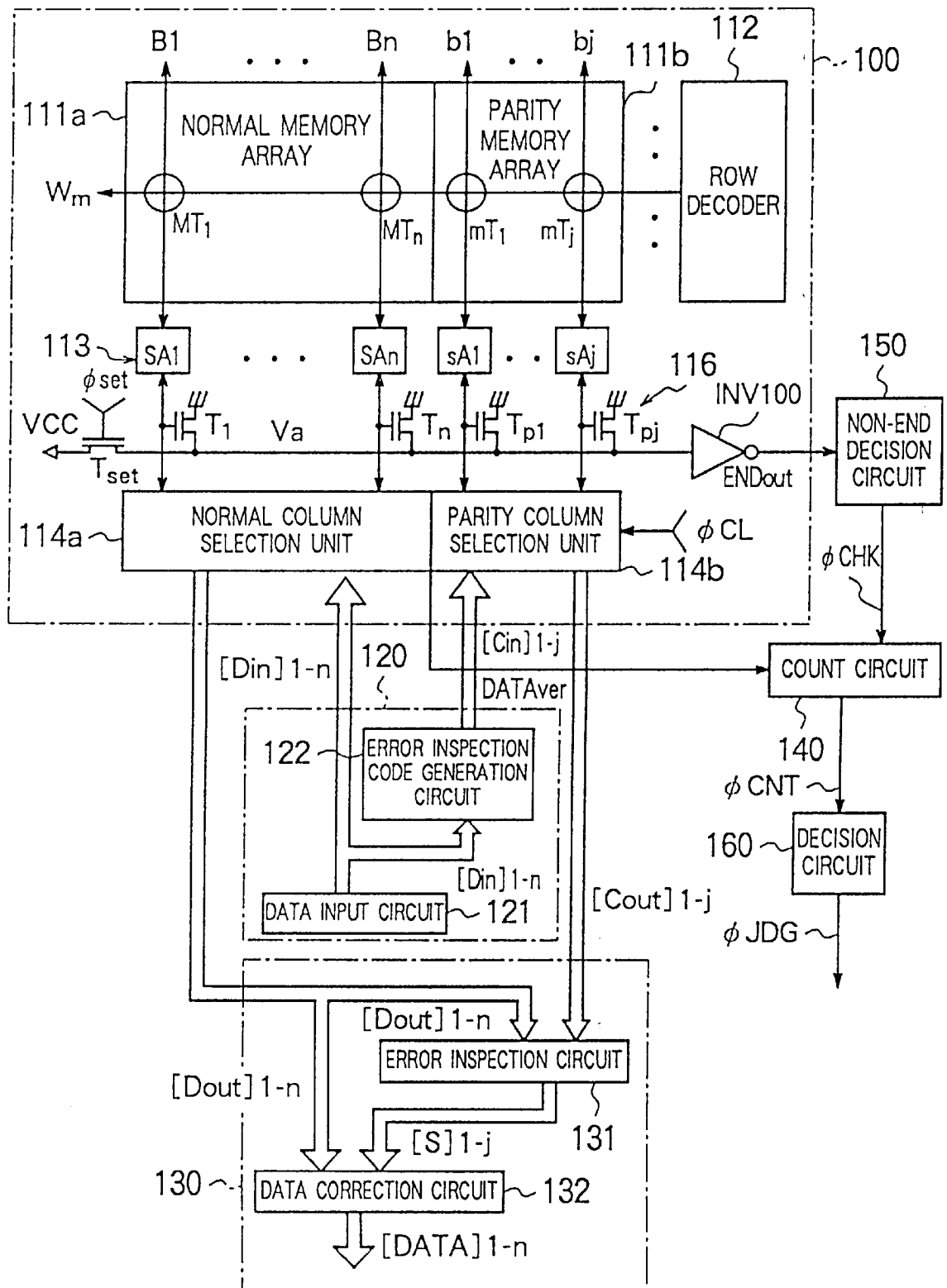
FIG. 10 is a view of an example of the configuration of a semiconductor nonvolatile memory according to a second embodiment of the present invention.

FIG. 10 is a view of an example of the configuration of a semiconductor nonvolatile memory according to the present invention, for example, a NOR type flash memory.

In FIG. 10, 100 denotes a memory. The memory 100 is constituted by a memory array 111, a row decoder 112, a data latch circuit group 113 provided for the bit lines, a column selection unit 114, an end point detection circuit 116, etc.

The memory array 111 is constituted by a normal memory array 111a and a parity memory array 111b.

In the normal memory array 111a, n (usually about 512 bytes) number of normal bit lines B1 to Bn are arranged. In the parity memory array 111b, j (usually about 10 bytes) number of parity bit lines b1 to bj are arranged.

Note that, in the figure, a case where the word line Wm is selected and the page reading is carried out with respect to the normal memory cells MT1 to MTn and the parity memory cells mT1 to mTj is illustrated.

The data latch circuit group 113 is constituted by the normal data latch circuits SA1 to SAn and the parity data latch circuits sA1 to sAj. The column selection unit 114 is constituted by a normal column selection unit 114a and a parity column selection unit 114b.

The column selection unit 114 operates in synchronization with the data transfer clock signal ΦCL, shifts the page program data to the normal data latch circuits SA1 to SAn and the parity data latch circuits sA1 to sAj, and reads the page data in word line units from the data latch circuit.

The end point detection circuit 116 is constituted by transistors T1 to Tn and Tp1 to Tpj provided for the normal data latch circuits SA1 to SAn and the parity data latch circuits sA1 to sAj, a transistor Tset, and an inversion circuit INV100.

The gate electrodes of the transistors T1 to Tn and Tp1 to Tpj are connected to inverted outputs of the normal data latch circuits SA1 to SAn and the parity data latch circuits sA1 to sAj, the source electrodes are connected to a ground potential, and the drain electrodes are commonly connected. When there are unerased cells and the inverted output of at least one data latch circuit is at the high level, the commonly connected end point detection potential Va becomes the ground potential and an end point detection signal ENDout is output as a high level by the inversion circuit INV100.

Further, the transistor Tset is provided for precharging the end point detection potential Va to the VCC level in advance and is driven by the precharge signal Φset preceding the detection of the end point.

Reference numeral 120 denotes a data input unit. The data input unit 120 is constituted by a data input circuit 121 and an error inspection code generation circuit 122.

The data input circuit 121 inputs normal input data [Din]1 to [Din]n to the error inspection code generation circuit 122 which generates the error inspection codes (parity input data) [Cin]1 to [Cin]j. The word line units of page program data formed by the normal input data [Din]1 to [Din]n and error inspection codes [Cin]1 to [Cin]j are shifted to the normal data latch circuits SA1 to SAn and the parity data latch circuits sA1 to sAj in synchronization with the data transfer clock signal ΦCL and page-programmed in the corresponding normal memory cells and parity memory cells.

Reference numeral 130 denotes a data output unit. The data output unit 130 is constituted by an error inspection circuit 131 and a data correction circuit 132.

The error inspection circuit 131 generates data demodulation codes [S]1 to [S]j from the page-read normal output data [Dout]1 to [Dout]n and error inspection codes (parity output data) [Cout]1 to [Cout]j.

The data correction circuit 132 corrects the error bits by the normal output data [Dout]1 to [Dout]n and data demodulation codes [S]1 to [S]j when there is less than a predetermined number (for example one bit) of error bits in the page read data and outputs the correct normal output data [DATA]1 to [DATA]n.

Reference numeral 140 denotes a count circuit. The count circuit 140 counts the number of the unerased memory cells as follows when there are unerased memory cells in pages in the erased block and the end point cannot be detected after repeatedly performing an erasing/verify operation a predetermined number of times (for example about 10 times to tens of times), that is, where the output of at least one data latch circuit is at the high level at the verify/reading operation for every page.

Namely, it shifts and inputs the verify page read data DATAver in synchronization with the basic data transfer clock signal ΦCL and finally counts the number of the unerased memory cells in accordance with the input of the check signal ΦCHK.

When inputting-the output signal ENDout of the inversion circuit INV100 of the memory 100 at a high level, the non-end decision circuit 150 deems that there is an unerased memory cell and outputs the check signal ΦCHK to the count circuit 140 so as to start the counting of the number of unerased memory cells.

The decision circuit 160 deems that there are one or more unerased cells and outputs the signal ΦjDG to the not illustrated control system if the output check signal ΦCNT of the count circuit 140 is switched to a high level.

In the case of the present embodiment as well, the decision circuit 160 is constituted by for example a flip-flop.

In the error correcting means in the semiconductor nonvolatile memory of FIG. 10, the relationship between the number n of bits of normal data enabling one bit error to be corrected and the number j of bits of parity data (number of error inspection bits) is the relationship shown in FIG. 8 similar to the case of the first embodiment.

No detailed description will be made of the principle of the error correction, error inspection code generation circuit 122, error inspection circuit 131, and data correction circuit 132 since they are not directly related to the gist of the present invention.

According to FIG. 8, 10 error inspection bits are necessary for 512 bits of normal data.

Accordingly, it is necessary to generate 10 bits of error inspection codes [Cin]1 to [Cin]n for 512 bytes of normal input data [Din]1 to [Din]n for every page when the erasing block unit is comprised by 64 Kbytes of 128 pages assuming that a word line has a 512 bytes page size.

Figure 11:
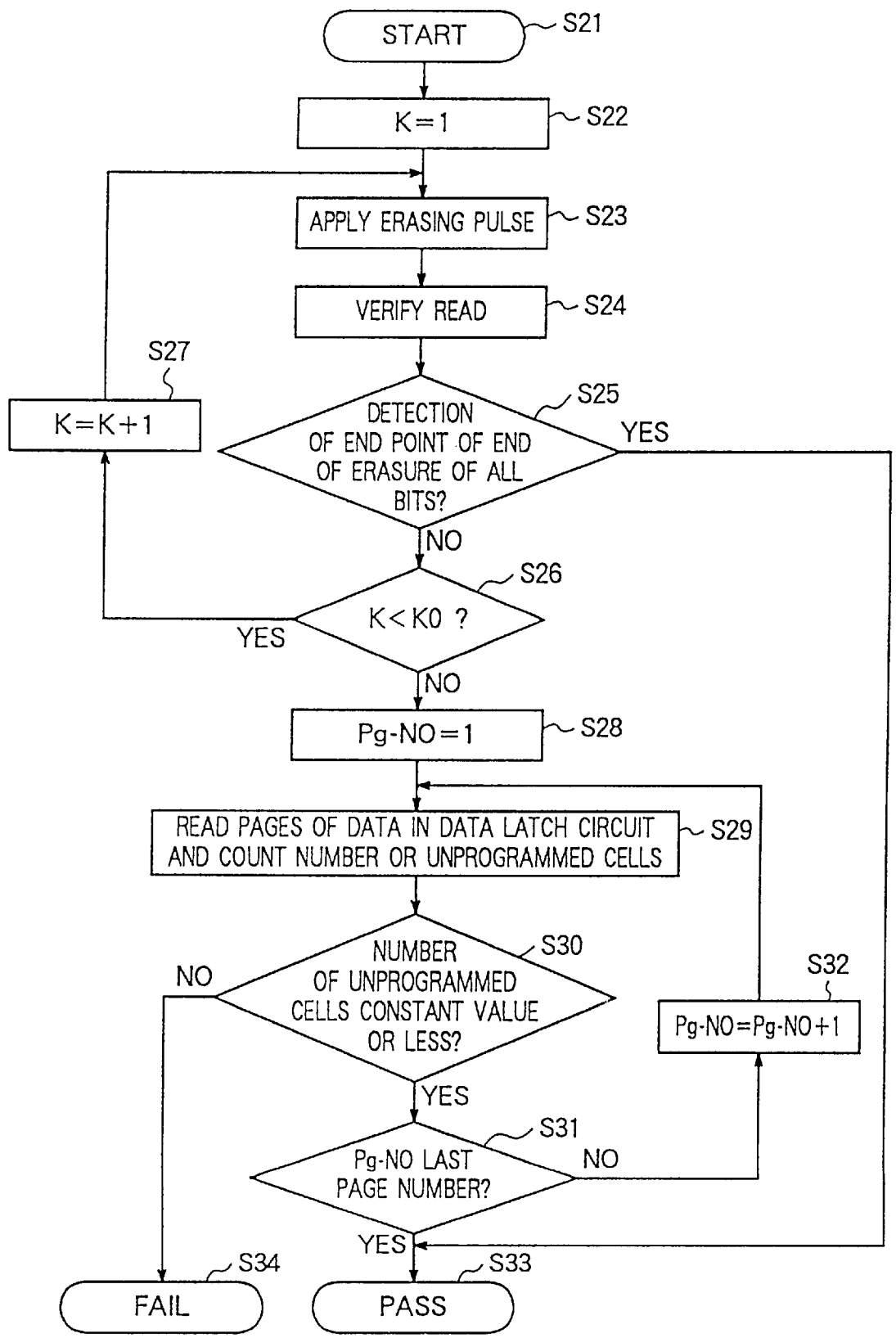
FIG. 11 is a view of the sequence flow at the time of erasing data in the semiconductor nonvolatile memory of FIG. 10.

FIG. 11 is a view of the sequence flow at the time of erasing data when rewriting data in the semiconductor nonvolatile memory of FIG. 10.

Figure 12:
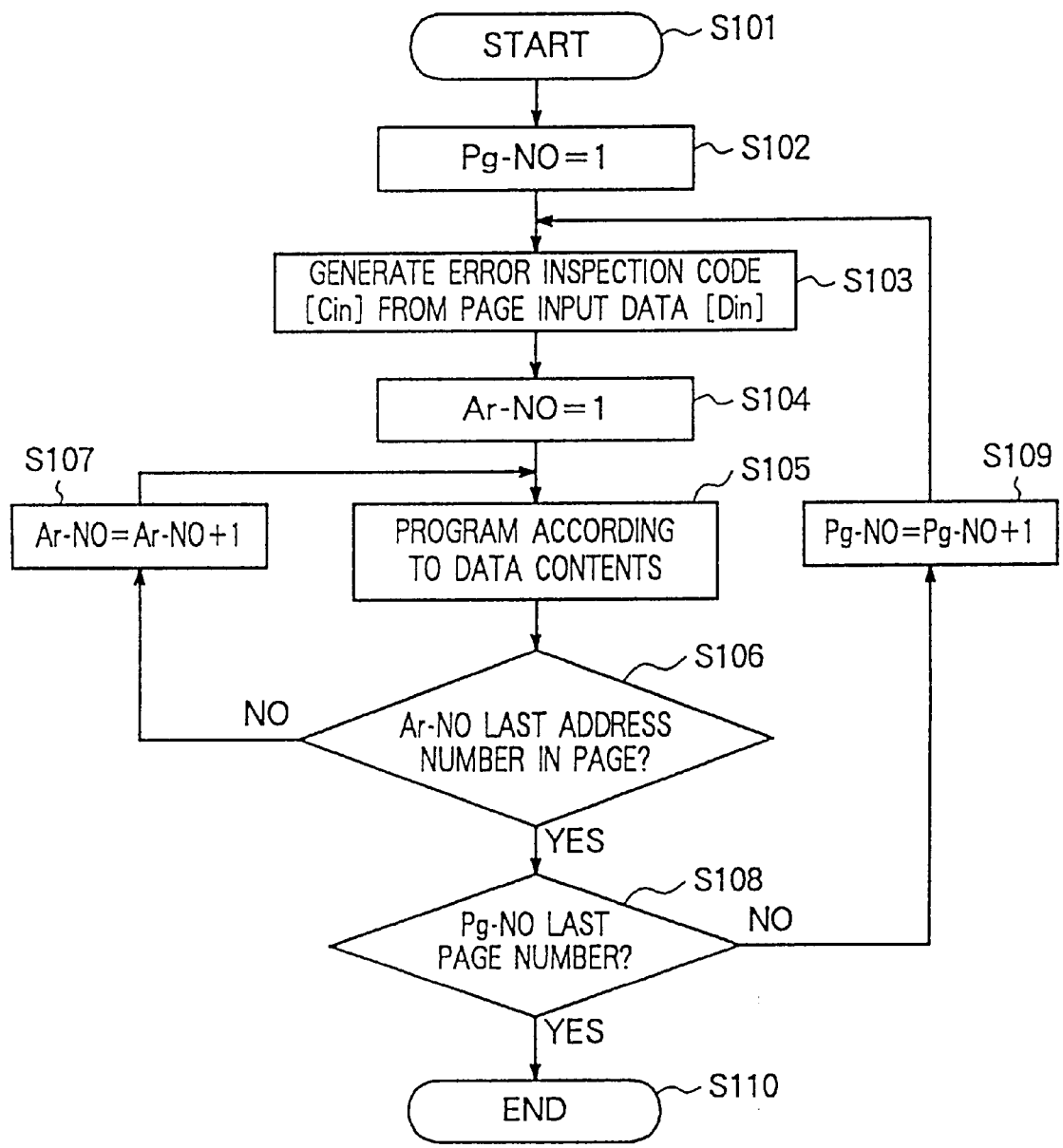
FIG. 12 is a view of the sequence flow at the time of programming data in the semiconductor nonvolatile memory of FIG. 10.

Further, FIG. 12 is a view of the sequence flow at the time of programming data after this.

Below, an explanation will be made of the sequence flow of FIG. 11 and FIG. 12 referring to the example of the configuration of FIG. 10, eta.

First, an explanation will be made of the sequence flow at the time of erasing data in FIG. 11.

At step S21, the data erasing operation is commenced. At step S22, the number of times K of the erasing/verify operation is set to the initial 1, then an erasing operation for applying an erasing pulse (step S23) and a verify/reading operation (step S24) are continuously carried out.

When the end point showing that all of the memory cells in the block have finished being erased can be detected as a result of the verify/reading operation of step S24 (step S25), the data erasing operation is ended.

On the other hand, when the end point showing that all of the memory cells in the block have finished being erased cannot be detected as a result of the verify/reading operation of step S24 (step S25), at step S26, it is checked whether or not the number of times K of the erasing/verify operation is less than the predetermined number of times K0 (for example about 10 to 100 times) set in advance.

When the result is that the number of times K of the erasing/verify operation is less than the set number of times k0, the number of times K of the erasing/verify operation is further incremented (step S27) and the sequence flow of the steps S23 to S27 is carried out again. When the number of times K of the erasing/verify operation reaches the set number of times K0, it is deemed that there are unerased memory cells and the routine shifts to the processing of step S28.

At step S28, the page address Pg-NO in the erasing block is first set to the initial "1", the erasing data of the data latch circuit is page-read, and the number of the unerased memory cells is counted (step S29).

Next, at step S30, it is checked whether or not the number of the counted unerased memory cells is less than the predetermined number for which error correction is possible (for example one).

When the result is that the number of the unerased memory cells exceeds the predetermined number for which error correction is possible, it is decided that the data erasing operation failed (step S34).

On the other hand, when the number of the unerased memory cells is less than the predetermined number for which error correction is possible, it is checked whether or not the page address Pg-NO is the last address (step S31).

When the page address Pg-NO is not the last address, the page address Pg-NO is further incremented (step S32) and the sequence flow of the steps S29 to S32 is carried out again. When the page address Pg-NO reaches the last page address, it is decided that the data erasing operation has been completed (step S33).

Next, an explanation will be made of the sequence flow at the time of programming data of FIG. 12.

Where the data finishes being erased (step S33 of FIG. 11), the data programming is commenced (step S101).

First, at step S102, the page address Pg-NO in the block is set to the initial "1", then the error inspection codes [Cin]1 to [Cin]j are generated by the error inspection code generation circuit 22 based on the normal input data [Din]1 to [Cin]n of the page (step S103).

Next, the address Pg-NOof the memory cell is set to the initial "1" in the page (step S104), then the data is programmed in accordance with the content of the data in the memory cells (step S105) and it is checked whether or not the address Ar-NO is the last address (step S106).

When the result is that the address Ar-NO is not the last address, the address Ar-NO is further incremented (step S107) and the sequence flow of steps S103 to S107 is carried out again. When the address Ar-NO reaches the last address, the data programming of the page is ended.

Next, it is checked at step S108 whether or not the page address Pg-NO is the last address.

When the result is that the address Pg-NO is not the last address, the page address Pg-NO is further incremented (step S109) and the sequence flow of steps S103 to S109 is carried out again. When the address Pg-NO reaches the last address, the data programming of the page is ended (S110).

In the semiconductor nonvolatile memory of the present invention in which data is rewritten by the above sequence flow, at the time or reading data, the error correction of the unerased memory cells is carried out by the error inspection circuit 131 and the data correction circuit 132 and the correct normal data [DATA]1 to [DATA]n are read.

As explained above, according to the semiconductor nonvolatile memory of the second embodiment, even if there are unerased memory cells after repeatedly performing the erasing operation a predetermined number of times, when the number of the unerased memory cells is less than a predetermined number of error bits which can be corrected by the error correcting means, the data is programmed while leaving the unerased memory cells.

Accordingly, high speed data programming becomes possible without being restricted by the very rare memory cells with slow erasing speeds. Consequently, the data can be rewritten at a high speed.

Further, excessive erasing of memory cells with fast erasing speeds can be prevented and a semiconductor nonvolatile memory having a high reliability can be realized.

As explained above, according to the present invention, a semiconductor nonvolatile memory with which data can be programmed at a high speed can be realized.

Further, according to the present invention, a semiconductor nonvolatile memory capable of erasing data at a high speed, able to rewrite data at a high speed, and further able to prevent the generation of excessively erased memory cells and achieving an improvement of reliability can be realized.

While the invention has been described by reference to specific embodiments chosen for purposes of illustration, it should be apparent that numerous modifications could be made thereto by those skilled in the art without departing from the basic concept and scope of the invention.

What is claimed is:

1. A semiconductor nonvolatile memory, comprising;
   a plurality of memory cells in which data is programmed electrically together for all memory cells of selected sector according to the data and are arranged in the form of a matrix;
   a plurality of data latch circuits provided for every bit line;
   a means for transforming sector units of page program data to the data latch circuits;
   an error correcting means for reading the page program data in units of the memory cells of the selected sector and correcting error bits when there are less than a predetermined number of error bits in the page read data;
   a means for detecting whether or not there are unprogrammed memory cells in every programming operation, in which the data is programmed according to the page program data by repeatedly performing a plurality of programming operations via a verify/reading operation;
   a means for counting the number of the unprogrammed memory cells when there are the unprogrammed memory cells after a predetermined number of programming operations are repeatedly carried out; and a means for ending the data programming while leaving the unprogrammed memory cells when the number of the unprogrammed memory cells is less than the predetermined number of error bits and making the error correcting means save the error bits.

2. A semiconductor nonvolatile memory as set forth in claim 1, wherein one of said sector units is a word line unit.

3. A semiconductor nonvolatile memory as set forth in claim 1, wherein the error correcting means is provided with a means for generating an error inspection code from normal data to be programmed;

a memory array constituted by a normal memory array portion for recording the normal data and a parity memory array portion for recording the error inspection code;

a means for programming the page program data combined with the normal data by the error inspection code in the memory array; and a means for correcting the error bits at the time of programming data by the normal data and the error inspection code at the time of reading the page program data.

4. A semiconductor nonvolatile memory as set forth in claim 1, wherein the means for detecting the unprogrammed memory cells is provided with a means for automatically setting a reprogram data by successively inverting the data latched in the data latch circuits connected to the programmed memory cells at every verify/reading operation after each programming operation; and an end point detecting means for detecting whether there is one or more data latch circuits latching unprogrammed data after the automatic setting of the reprogram data.

5. A semiconductor nonvolatile memory as set forth in claim 1, wherein the counting means of said unprogrammed memory cells performs the page reading by the operation of a column decoder synchronized to a constant clock pulse, successively shifts the page read data to the counting means, and counts the number of bits of unprogrammed data.

6. A semiconductor nonvolatile memory as set forth in claim 1, wherein a memory array in which said memory cells are arranged in the form of the matrix exhibits a NAND type structure in which a plurality of memory cells are connected in series.

7. A semiconductor nonvolatile memory as set forth in claim 1, wherein:

a memory array in which said memory cells are arranged in the form of the matrix exhibits a NOR type structure; and a main bit line is divided into a plurality of sub-bit lines via an operational connecting means.

* * * * *